United States Patent [19]

Koch

[11] E Re. 28,581

[45] Reissued Oct. 28, 1975

[54] ROLLER-TYPE PRESS

[75] Inventor: Friedhelm Koch, Hattingen-Blankenstein, Germany

[73] Assignee: Maschinenfabrik Koppern & Co. KG, Germany

[22] Filed: Nov. 18, 1974

[21] Appl. No.: 524,801

Related U.S. Patent Documents

Reissue of:

[64] Patent No.: 3,760,477
Issued: Sept. 25, 1973
Appl. No.: 197,270
Filed: Nov. 10, 1971

[30] Foreign Application Priority Data

Nov. 10, 1970 Germany ..... 2055147

[52] U.S. Cl. ..... 29/124
[51] Int. Cl.[2] ..... B21B 27/02
[58] Field of Search ..... 29/124, 125; 425/107, 194, 425/195

[56] References Cited

UNITED STATES PATENTS

| | | | |
|---|---|---|---|
| 538,475 | 4/1895 | Albrecht | 425/107 |
| 1,357,141 | 10/1920 | Bibb | 425/194 |
| 2,081,724 | 5/1937 | Abbott | 425/194 |
| 2,638,722 | 5/1953 | Rimmel | 29/124 X |
| 2,658,262 | 11/1953 | Clements | 29/125 X |
| 2,770,082 | 11/1956 | Whitesell | 29/124 X |
| 2,949,634 | 8/1960 | Shipley | 425/194 |
| 2,958,903 | 11/1960 | Decker | 425/195 |
| 3,180,007 | 4/1965 | Gartz | 29/124 |
| 3,460,293 | 8/1969 | Sweet | 29/124 |
| 3,670,381 | 6/1972 | Schoffmann | 29/124 |

FOREIGN PATENTS OR APPLICATIONS

| | | | |
|---|---|---|---|
| 567,069 | 1/1945 | United Kingdom | 29/124 |

*Primary Examiner*—Alfred R. Guest
*Attorney, Agent, or Firm*—Craig & Antonelli

[57] ABSTRACT

A roller-type press including rollers having a roller core on which segments are secured to form a complete annulus. Each of the segments are provided at their longitudinal edges with supporting projections and recesses arranged therebetween to receive the supporting projections of adjacent segments. The segments may be fixed to the roller core by means of bolts, screws or cooled shrunk rings overlapping projections on each of the segments.

38 Claims, 3 Drawing Figures

ROLLER-TYPE PRESS

Matter enclosed in heavy brackets [ ] appears in the original patent but forms no part of this reissue specification; matter printed in italics indicates the additions made by reissue.

---

The invention relates to a roller type press, the rollers of which have a roller core on which latter a plurality of segments is secured to form a complete annulus.

In the known roller presses of this type the end faces with which the segments lie opposite each other mainly extend radially or at an angle relative to the radius and that in a manner as to form a gap enlarging in the direction of the roller core.

The drawback of these known segment types resides therein that, during the passing of the pressing zone through the segments, a high end pressure occurs in the bearing surface of the roller core adjacent the respective dividing line of the segments. By high pressure, the ends of the segments press into the roller body along the dividing line thereby resulting in permanent sets. Thus [case] the segments tend to tilt since they no longer rest completely on the roller core. It may further happen that the line of action of the resultant of all pressing forces in the pressing gap intersect the bearing surface of the segment outside the end of the segment so that an additional tilting moment occurs.

It is an object of the present invention to reduce the maximum surface pressure with the given pressing force and to avoid the occurrence of the abovementioned tilting moments.

According to the invention this probelm is solved in that the segments are provided at their longitudinal edges with a plurality of supporting projections and recesses arranged between each of said supporting projections to receive the supporting projections of the adjacent segments.

Preferably the said supporting projections and the recesses extend from the bearing surface of the segments over a limited length of the height of the segments.

A particularly useful embodiment is characterized in that the upper sides of the supporting roots and of the recesses are arranged at an acute angle relative to the roller radius.

Suitably, the supporting projections should project so far that the supporting width over the ends of the supporting projections is at least equal to the length of arc of the segments on the periphery of the roller core.

The contact surface between the roller core and the segments may be cylindrical.

The fixing of the segments may be made in such a manner that they are secured with their ends to the roller core by means of bolts or screws.

But the segments may also be provided at their ends with projections, the fixing means being two cooled shunk rings over-lapping the projections.

The invention will be further described, by way of example with reference to the accompanying drawing and in the appended claims. In the drawing:

Figure 2:
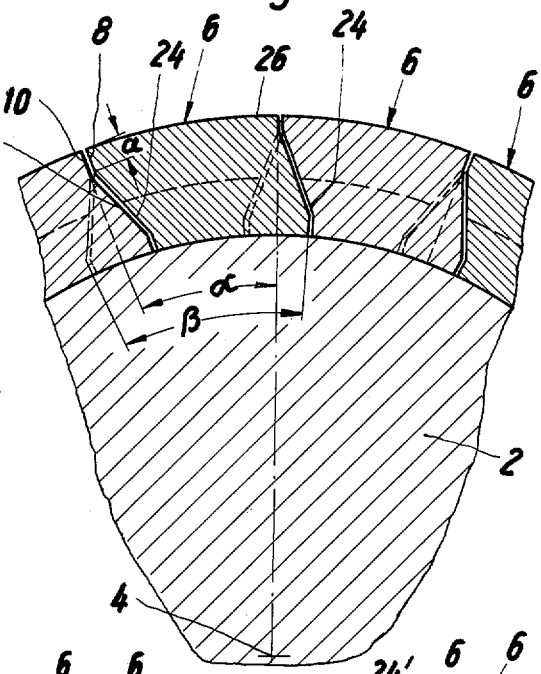
FIG. 2 is a cross-section along the line II—II in FIG. 1.

The roller shown in the drawing may be the roller of a roller-type press operating on two contra-rotating rollers for the compacting of bulk material, for example the roller of a roller-type briquette press or rather the roller in a smooth roller system for the production of shells.

Spaced along the circumference of a roller core 2 having a centre axis 4 there is arranged a plurality of segments 6 forming together an annulus. The segments 6 extend on their outer periphery over an arc with the angle $\alpha$. Adjacent the outer circumference of the segments 6 the segments lie opposite each other over a length a of their thickness with straight-lined end faces 8, 10 extending in axial direction.

Underneath the said straight-lined faces the segments are provided with a plurality of supporting projections 14 engaging into corresponding recesses 16 in the opposite front edge of the adjacent segment. Thus, the arc, against which the segments on the roller core bear, is increased from the arc at the angle $\alpha$ to the arc at the angle $\beta$.

Figure 3:
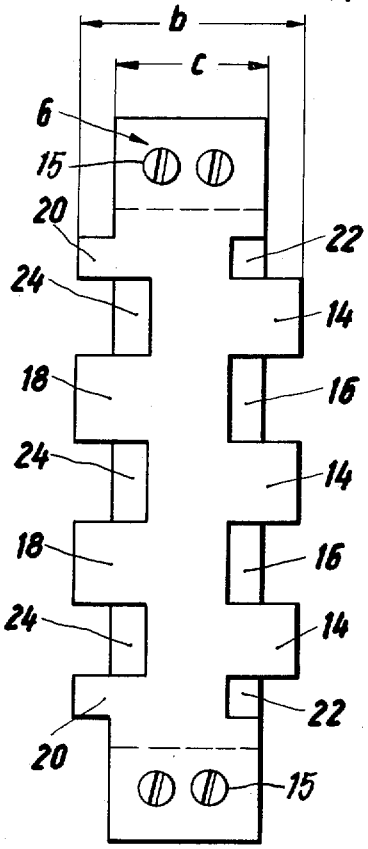
FIG. 3 is a view of a segment according to the invention from below.
Figure 1:
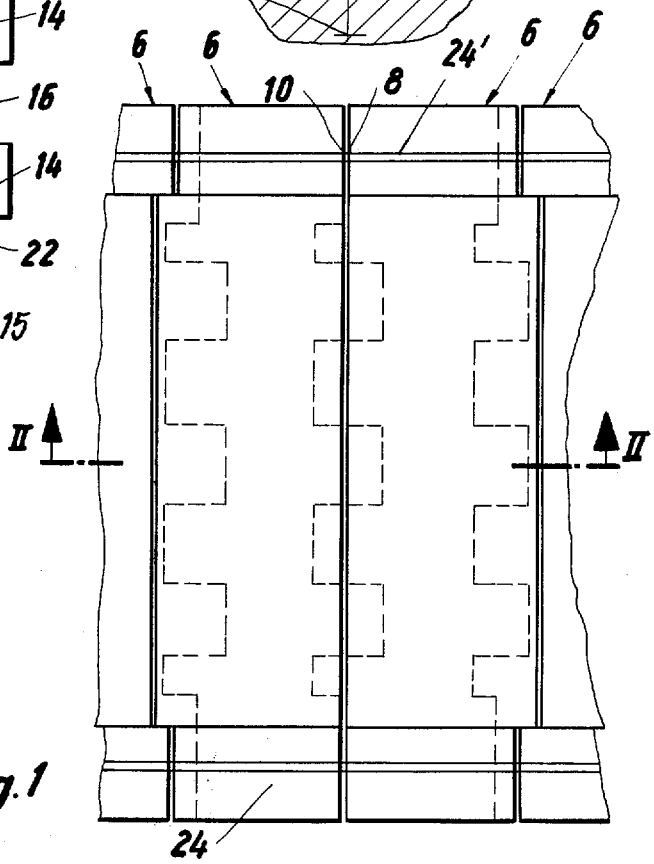
FIG. 1 is a plan view of a section of roller with segments according to the invention.

As will be seen from FIG. 3 the embodiment shows three supporting projections 14 of equal width and symmetrically arranged along one of the longitudinal edges of the segment 6, and two recesses 16 arranged between said supporting projections 14. At the opposite longitudinal edge of the segment 6 there are provided two supporting projections 18 again in symmetrical arrangement, and two additional external supporting projections 20 having half the width of the supporting projections 18. For these roots 20 recesses 22 of corresponding width are provided in the opposite longitudinal edge said segment 6. Recesses 24 are provided between each of the supporting roots 18 and 20. The projections and the recesses are so defined in their dimensions as to allow the projections to have sufficient play in their engagement into the recesses.

As will be seen from FIG. 3 and from what has been said above the total bearing surface of the segments 6 is substantially equal to the bearing surface in known segments having plane end faces. But by the arrangement of the projections according to the invention, the supporting width b is increased over the supporting width c in the known segments. According to this the end pressure is substantially reduced and occurrence of tilting moments avoided since now the line of action of the resultant always extends within the bearing surface of the segment.

Suitably the segments according to the invention are made by chill casting, the manufacture of the projections and recesses presenting no difficulties.

The fixing of the segments on the roller core may be made in usual manner. So, for example the segments may be secured at their ends to the roller core by means of bolts or screws 15. Otherwise, the segments may be provided at their ends, as shown in the drawing, with projections 24', the fixing means being in that case two shrunk rings [17] overlapping the projections; suitably the shrunk rings are cooled in case of roller presses for the pressing process of hot material.

The segments according to the invention are particularly useful in rollers having a roller core with a cylindrical surface.

The periphery 26 of the segments may either be smooth or may be provided with moulds, as the case may be.

I claim:

1. A roller-type press comprising at least one roller having a roller core, a plurality of segments secured to said core thereby forming a complete annulus, said segments being provided along the longitudinal edges thereof with a plurality of supporting projections and recesses arranged between each of said supporting projections to receive the supporting projections of an adjacent segment.

2. A roller-type press as claimed in claim 1 wherein said segments include a bearing surface and said supporting projections and said recesses extend from said bearing surface over a limited length of the height of the segment.

3. A roller type press as claimed in claim 2, wherein at least a portion of the sides of said supporting projections and said recesses form an acute angle with a radius vector of said roller core.

4. A roller-type press as claimed in claim 3, wherein said segments are disposed along an arc of said roller core and said supporting projections provide a supporting width at least equal to the length of said arc of said roller core.

5. A roller-type press as claimed in claim 4, wherein the contact surface between the roller core and the segments is cylindrical.

6. A roller-type press as claimed in claim 5, wherein each of said segments is secured to said roller core by means of screws.

7. A roller-type press as claimed in claim 5, wherein each of said segments are provided at their ends with projections extending in the axial direction of the hollow core, said segments being secured by a pair of cooled shrunk rings overlapping said projections.

8. A roller-type press as claimed in claim 1 wherein at least a portion of the sides of said supporting projections and said recesses form an acute angle with a radius vector of said roller core.

9. A roller-type press as claimed in claim 1 wherein said segments are disposed along an arc of said roller core and said supporting projections provide a supporting width at least equal to the length of said arc of said roller core.

10. A roller-type press as claimed in claim 1, wherein the contact surface between the roller core and the segments is cylindrical.

11. A roller-type press as claimed in claim 1, wherein each of said segments is secured to said roller core by means of screws.

12. A roller-type press as claimed in claim 1, wherein each of said segments are provided at their ends with projections extending in the axial direction of the hollow core, said segments being secured by a pair of cooled shrunk rings overlapping said projections.

*13. A roller core having a plurality of segments secured thereto thereby forming an annulus, said segments being provided along the longitudinal edges thereof with a plurality of supporting projections and recesses arranged between each of said supporting projections to receive the supporting projections of an adjacent segment.*

*14. A roller core as claimed in claim 13, wherein said segments include a bearing surface and said supporting projections and said recesses extend from said bearing surface over a limited length of the height of the segment.*

*15. A roller core as claimed in claim 14, wherein at least a portion of the sides of said supporting projections and said recesses form an acute angle with a radius vector of said roller core.*

*16. A roller core as claimed in claim 15, wherein said segments are disposed along an arc of said roller core and said supporting projections provide a supporting width at least equal to the length of said arc of said roller core.*

*17. A roller core as claimed in claim 16, wherein the contact surface between the roller core and the segments is cylindrical.*

*18. A roller core as claimed in claim 17, wherein each of said segments is secured to said roller core by means of screws.*

*19. A roller core as claimed in claim 17, wherein each of said segments are provided at their ends with projections extending in the axial direction of the roller core, said segments being secured by a pair of cooled shrunk rings overlapping said projections.*

*20. A roller core as claimed in claim 13, wherein at least a portion of the sides of said supporting projections and said recesses form an acute angle with a radius vector of said roller core.*

*21. A roller core as claimed in claim 13, wherein said segments are disposed along an arc of said roller core and said supporting projections provide a supporting width at least equal to the length of said arc of said roller core.*

*22. A roller core as claimed in claim 13, wherein the contact surface between the roller core and the segments is cylindrical.*

*23. A roller core as claimed in claim 13, wherein each of the segment is secured to said roller core by means of screw.*

*24. A roller core as claimed in claim 13, wherein each of said segments is provided at its ends with projections extending in the axial direction of the hollow core, said segments being secured by a pair of cooled shrunk rings overlapping said projections.*

*25. A segment adapted to be secured to a roller core in a roller-type press being provided along the longitudinal edges thereof with a plurality of supporting projections, and recesses arranged between each of said supporting projections and being adapted to receive the supporting projections of an adjacent segment.*

*26. A segment as claimed in claim 25 being further provided with a bearing surface, with said supporting projections and said recesses extending from said bearing surface over a limited length of the height of the segment.*

*27. A segment as claimed in claim 26, wherein at least a portion of the sides of said supporting projections and said recesses are adapted to form an acute angle with a radius vector of a roller core to which the segment is adapted to be secured.*

*28. A segment as claimed in claim 27, wherein the segment is adapted to be disposed along an arc of a roller core, and said supporting projections provide a supporting width at least equal to the length of the arc of the roller core to which the segment is adapted to be secured.*

*29. A segment as claimed in claim 28, wherein the surface of the segment adapted to contact a roller core is a portion of a cylindrical surface.*

*30. A segment as claimed in claim 29, wherein means are provided for securing the segment to a roller core.*

*31. A segment as claimed in claim 30, wherein the securing means include screws.*

*32. A segment as claimed in claim 30, wherein said securing means include projections provided at each end of the segment extending in the axial direction of the roller core and a pair of cooled shrunk rings adapted to overlap said end projections.*

*33. A segment as claimed in claim 25, wherein at least a portion of the sides of said supporting projections and said recesses are adapted to form an acute angle with a radius vector of a roller core to which the segment is adapted to be secured.*

*34. A segment as claimed in claim 25, wherein the segment is adapted to be disposed along an arc of a roller core, and said supporting projections provide a supporting width at least equal to the length of the arc of the roller core to which the segment is adapted to be secured.*

*35. A segment as claimed in claim 25, wherein the surface of the segment adapted to contact a roller core is a portion of a cylindrical surface.*

*36. A segment as claimed in claim 25, wherein means are provided for securing the segment to a roller core.*

*37. A segment as claimed in claim 36, wherein said securing means include screws.*

*38. A segment as claimed in claim 36, wherein said securing means include projections provided at each end of the segment extending in the axial direction of the roller core and a pair of cooled shrunk rings adapted to overlap said end projections.*

* * * * *